United States Patent
Jo et al.

(10) Patent No.: US 8,815,432 B2
(45) Date of Patent: *Aug. 26, 2014

(54) HEAT RESISTING ULTRAFINE FIBROUS SEPARATOR AND SECONDARY BATTERY USING THE SAME

(75) Inventors: Seong-Mu Jo, Seoul (KR); Dong-Young Kim, Seoul (KR); Byung-Doo Chin, Gyeonggi-Do (KR)

(73) Assignee: Korea Institute of Science and Technology, Seoul (KR)

( * ) Notice: Subject to any disclaimer, the term of this patent is extended or adjusted under 35 U.S.C. 154(b) by 968 days.

This patent is subject to a terminal disclaimer.

(21) Appl. No.: 12/376,511

(22) PCT Filed: Dec. 8, 2006

(86) PCT No.: PCT/KR2006/005364
§ 371 (c)(1),
(2), (4) Date: May 20, 2010

(87) PCT Pub. No.: WO2008/018656
PCT Pub. Date: Feb. 14, 2008

(65) Prior Publication Data
US 2010/0233523 A1 Sep. 16, 2010

(30) Foreign Application Priority Data
Aug. 7, 2006 (KR) .................. 10-2006-0074389

(51) Int. Cl.
*H01M 2/16* (2006.01)
(52) U.S. Cl.
USPC ........... 429/129; 429/144; 156/167; 428/220; 428/221; 428/304.4; 428/327; 428/338; 428/340; 442/327; 442/400

(58) Field of Classification Search
USPC ........... 429/129, 144; 156/167; 428/220, 221, 428/304.4, 327, 338, 340; 442/327, 400
See application file for complete search history.

(56) References Cited

U.S. PATENT DOCUMENTS

| 4,994,335 A | 2/1991 | Kamaei et al. ............... 429/254 |
| 5,609,976 A | 3/1997 | Ueda et al. .................... 429/254 |

(Continued)

FOREIGN PATENT DOCUMENTS

| JP | 02-259189 | 10/1990 |
| JP | 2001-222988 | 8/2001 |

(Continued)

OTHER PUBLICATIONS

International Search Report and Written Opinion issued May 7, 2009 in corresponding PCT International Application No. PCT/KR2006/005364.

(Continued)

*Primary Examiner* — Brian P Mruk
(74) *Attorney, Agent, or Firm* — Baker & Hostetler LLP (57) ABSTRACT

A heat-resisting ultrafine fibrous separator of the present invention is prepared by an electrospinning process, formed of ultrafine fibers of heat-resisting polymer resin having a melting point more than 1800 C or not having the melting point, or ultrafine fibers of polymer resin capable of swelling in an electrolyte, together with the ultrafine fibers of heat-resisting polymer resin. Also, polyolefine fine particles providing a shutdown function are dispersed in the heat-resisting resin or the polymer resin capable of swelling in the electrolyte. The heat-resisting ultrafine fibrous separator of the present invention has the shutdown function, low thermal contraction, thermal endurance, excellent ionic conductivity and excellent adhesive property with an electrode, so a battery having excellent cycling characteristics, and having high-energy density and high capacity can be prepared.

28 Claims, 2 Drawing Sheets

(56) References Cited

U.S. PATENT DOCUMENTS

| | | | |
|---|---|---|---|
| 6,296,969 B1 | 10/2001 | Yano et al. | 429/145 |
| 6,447,958 B1 | 9/2002 | Shinohara et al. | 429/248 |
| 2002/0045091 A1 | 4/2002 | Kamei et al. | |
| 2006/0019154 A1 | 1/2006 | Imachi et al. | 429/144 |

FOREIGN PATENT DOCUMENTS

| | | | | |
|---|---|---|---|---|
| JP | 2002-249966 | | 9/2002 | |
| JP | 2005-209570 | | 8/2005 | |
| JP | 2006-059717 | | 3/2006 | |
| JP | 2006-092829 | | 4/2006 | |
| JP | 2006-527911 | | 12/2006 | |
| JP | 2009-510788 | | 3/2009 | |
| KR | 1020030007633 | | 1/2003 | |
| KR | 1020050006540 | * | 1/2005 | |
| KR | 1020050006540 | | 1/2005 | |
| KR | 1020060060188 | | 6/2006 | |
| WO | WO 01/89021 | | 11/2001 | |
| WO | WO 01/89023 | * | 11/2001 | H01M 10/40 |
| WO | WO 2006/049151 | | 5/2006 | |

OTHER PUBLICATIONS

Taylor, Sir Geoffrey, Electrically driven jets, Proc. Roy. Soc. Lond., vol. A.313, Mar. 26, 1969, pp. 453-475.

Doshi, Jayesh & Reneker, Darrell H., Electrospinning Process and Applications of Electrospun Fibers, Journal of Electrostatics, Elsevier Science B.V., vol. 35 (1995) pp. 151-160.

Letter from Japanese Associate to Korean Associate enclosing Japanese Office Action with Korean Associate's receipt of service stamp dated Oct. 31, 2011.

Japanese Office Action mailed Oct. 25, 2011 in connection with corresponding Japanese Patent Application No. 2009-523698.

Search Report issued by European Patent Office in connection with corresponding application No. EP 06 82 4070 on Jun. 28, 2011.

Steinwall Inc., Brochure, Minneapolis, MN; Nov. 1, 2012, p. 1, www.steinwall.com.

* cited by examiner

HEAT RESISTING ULTRAFINE FIBROUS SEPARATOR AND SECONDARY BATTERY USING THE SAME

CROSS-REFERENCE TO RELATED APPLICATIONS

The present application is a 35 U.S.C. §§371 national phase conversion of PCT/KR2006/005364, filed Dec. 8, 2006, which claims priority of Korean Patent Application No. 10-2006-0074389, filed Aug. 7, 2006. The PCT International Application was published in the English language.

TECHNICAL FIELD

The present invention relates to a heat resisting ultrafine fibrous separator, and more particularly, to heat resisting ultrafine fibrous separator having a shut-down function, excellent thermal endurance and excellent ionic permeability, accordingly having excellent charging/discharging characteristics, and an electrochemical device using the same.

BACKGROUND ART

As the needs of the consumers have been changed due to digitization and high-efficiency of electronics products, a new trend is driven to develop thin and light batteries with high capacity by high-energy density. And, in order to deal with problems in the future energy and environment, the developments for hybrid electric vehicles or electric vehicles, and fuel cell vehicles have actively been progressed. Accordingly, large-sized batteries for an automobile electric power source are required.

A secondary battery including a lithium ion secondary battery, a lithium ion polymer battery and a super capacitor (electric double layer capacitor and pseudo-capacitor), which has a high-energy density and a large capacity, should have a range of relatively high operating temperature, and the temperature thereof would increase when it is continuously used in a high-rate charging/discharging state, accordingly, it requires thermal endurance and thermal stability for a separator used for these batteries higher than those which are required in a general separator. Also, it requires excellent battery characteristics such as rapid charging/discharging and high ionic conductivity even at a low temperature.

A separator is disposed between an anode and a cathode of the battery for insulation, holds an electrolyte to provide a passage for an ionic conduction, and has a shutdown function closing pores as the separator is partially melt to block an electric current when the temperature of the battery excessively rises.

When the separator is melt as the temperature goes higher, then a big hole is made, causing a short circuit between the anode and the cathode. This temperature is called a "short circuit temperature." Generally, a separator should have a low shutdown temperature and a higher short circuit temperature. When a battery abnormally generates heat, a polyethylene separator is contracted at a temperature more than 150° C. and exposes the electrode portion thereof, indicating the possibility to cause the short circuit.

Therefore, it is very important for the secondary battery of a high-energy density and a large size to have both the shutdown function and thermal endurance. That is, a separator is needed, which has less thermal contraction because of excellent thermal endurance and excellent cycling capability according to high ionic conductivity.

A lithium ion battery using a polyolefine separator and a liquid electrolyte, or a lithium ion polymer battery using a gel-coated polyolefine separator or using a gel polymer electrolyte film, in a conventional art, is very insufficient to be used for a battery having a high-energy density and a high capacity in an aspect of thermal endurance. Therefore, the thermal endurance required from batteries having a high capacity and a large size for automobiles is not satisfying a requirement for safety.

In order to solve the above-mentioned problems, in United States Patent Laid Open Publication No. 2006/0019154 A1, there is provided a heat-resisting polyolefine separator, in which the polyolefine-based separator is impregnated in a solution of polyamide, polyimide and polyamidimide having a melting point more than 180° C., and then is immersed into a coagulation solution, thereby extracting a solvent and adhering a porous heat-resisting resin thin layer thereto, claiming that it has less thermal contraction, excellent thermal endurance and excellent cycling performance. The heat-resisting thin layer provides porosity through the solvent extraction, and the polyolefine separator is limited to use, of which air permeability is less than 200 sec/min.

In Japanese Patent Laid Open Publication No. 2005-209570, in order to secure sufficient safety for a high-energy density and a large size, there is provided a polyolefine separator, in which both surfaces of the polyolefine separator is deposited with a heat-resisting resin solution such as aromatic polyamide, polyimide, polyethersulfon, polyetherketon, and polyetherimide having a melting point more than 200° C., and then is immersed-washed-dried in a coagulation solution, thereby adhering to a heat-resisting resin. In order to reduce the deterioration of the ionic conductivity, the phase separating agent for providing a porosity is contained in the heat-resisting resin solution and is limited to the heat-resisting resin layer of 0.5-6.0 g/ml.

However, immersion in the heat-resisting resin causes pores of the polyolefine separator to be blocked and the movement of the lithium ion to be restricted, resulting in deterioration of charging/discharging characteristics. Thereby, even though thermal endurance is secured, the need for a large-capacity battery for automobiles is not satisfied. Further, even though the porous structure of the polyolefine porous film is not blocked by the immersion of the heat-resisting resin, the porosity of the polyolefine separator which is conventionally used is about 40% and the size of the pore is several tens nm, so there is limited on ion conductivity for large capacity batteries.

In U.S. Pat. No. 6,447,958 B1, there is provided a preparation process of a heat-resisting separator, that is, a slurry made through a dissolution and a dispersion of ceramic powder and heat-resisting nitrogen-contained aromatic polymer in an organic solvent performs a function as a support, then coated with porous fabric cloth, such as polyolefine, rayon, vinylon, polyester, acryl, polystyrene, nylon, etc, non-woven fabric, paper, porous film and so on, from which the solvent is eliminated. But, the preparation process for the heat-resisting polymer layer, in which the heat-resisting polymer layer is deposited and then is immersed-washed-dried in the coagulation solution, is very complicated and requires high preparing cost.

In Japanese Patent Laid Open Publication No. 2001-222988 and 2006-59717, there is provided a heat-resisting electrolyte film, in which fabric cloth, non-woven fabric, cloth, porous film, etc. of polyaramide and polyimide having a melting point more than 150° C. are impregnated with polymer gel electrolyte such as polyethylene oxide, polypropylene oxide, polyether, polyvinylidene, etc. However, even though thermal endurance is secured as required, in the aspect of ionic conductivity, the movement of the ion in the support or the heat-resisting aromatic polymer layer is still limited, similar to that of the separator or the gel electrolyte in the conventional lithium ion battery.

Therefore, the thermal endurance and the ionic conductivity still can not be satisfactory at the same time, there is nothing mentioned about the shutdown function of the separator and it is not still satisfactory for a battery having a high-energy density and a large capacity, such as for automobiles requiring excellent functions in severe conditions such as thermal endurance and rapid charging/discharging.

DISCLOSURE OF THE INVENTION

Technical Problem

To achieve these and other advantages and in accordance with the purpose of the present invention, as embodied and broadly described herein, there is provided a separator having a shutdown function, low thermal contraction, thermal endurance, excellent ionic conductivity and adhesive property with an electrode, thereby, usable for a secondary battery including a lithium ion secondary battery, a lithium ion polymer battery and a super capacitor a battery, which has excellent cycling characteristics and has a high-energy density and a high capacity when a battery is prepared, and a secondary battery using the same

Technical Solution

To achieve these and other advantages and in accordance with an aspect of the present invention, there is provided a heat-resisting ultrafine fibrous separator, in which a heat-resisting polymeric material having a melting point more than 180° C. or not having a melting point exists in a fibrous phase formed by electrospinning.

Preferably, the separator may further include a fibrous phase formed by electrospinning of a swelling polymeric material which swelling occurs in an electrolyte.

Further, the electrospinning may include electro-blowing, meltblown, or flash spinning.

Further, the separator may further include polyolefine-based fine particles.

Meanwhile, to achieve these and other advantages and in accordance with another aspect of the present invention, there is provided a secondary battery including two different electrodes; a heat-resisting ultrafine fibrous separator intervened between the two electrodes, in which a heat-resisting polymeric material having a melting point more than 180° C. or not having the melting point exists in a fibrous phase by the electrospinning; and an electrolyte.

Preferably, the separator may further include a fibrous phase formed by the electrospinning of a swelling polymeric material in which swelling occurs in the electrolyte.

Effect of the Invention

A heat-resisting ultrafine fibrous separator in accordance with the present invention has a shutdown function, low thermal contraction, thermal endurance, excellent ionic conductivity and excellent adhesive property with an electrode, so a battery having excellent cycling characteristics and having a high-energy density and a high capacity can be prepared. Since forming an ultrafine fibrous layer as well as removing solvent and forming pores are performed at the same time through an electrospinning process, so it can be prepared in a very simple and easy process compared to the process in the conventional art.

Therefore, the heat-resisting ultrafine fibrous separator is particularly useful to electrochemical devices (a secondary battery including a lithium ion secondary battery, a lithium ion polymer battery and a super capacitor) requiring high thermal endurance and thermal stability, such as a hybrid electric automobile, an electric automobile and a fuel cell automobile.

MODES FOR CARRYING OUT THE PREFERRED EMBODIMENTS

Reference will now be made in detail to the preferred embodiments of the heat-resistant separator having ultrafine fibrous layer according to the present invention.

The present invention provides a heat-resisting ultrafine fibrous separator having a shutdown function, low thermal contraction, thermal endurance, excellent ionic conductivity and adhesive property with an electrode, thereby, capable of preparing a battery having excellent cycling characteristics as well as a high-energy density and a high capacity.

The heat-resisting ultrafine fibrous separator is prepared by a process such as an electrospinning and formed of an ultrafine fibrous phase of heat-resisting polymeric resin having a melting point more than 180° C. or not having the melting point.

Further, the separator of the present invention may include a fibrous phase formed by the electrospinning of a swelling polymeric material which swelling occurs in an electrolyte, together with the ultrafine fibrous phase of the heat-resisting polymeric resin. Herein, the fibrous phase of the swelling polymeric material performs functions of reinforcing an adhesive force between the ultrafine fibrous separator and the electrode, and enhancing an electrolyte retention of the ultrafine fibrous separator.

Further, in the separator of the present invention, polyolefine-based fine particles providing a shutdown function may be spread in the heat-resisting resin or the swelling polymer resin.

Figure 1:
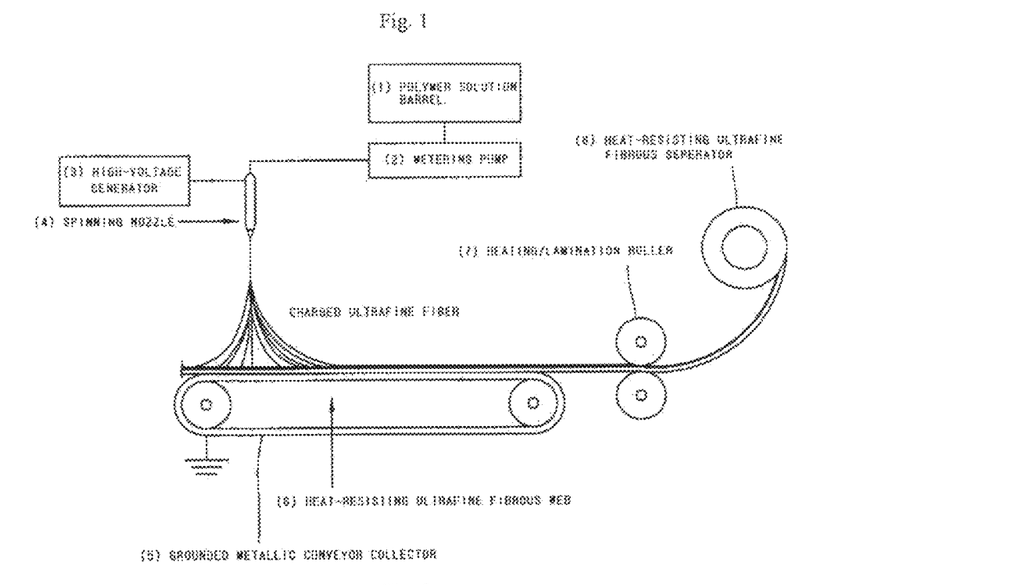
FIG. 1 is a diagram showing a preparation process of a heat resisting ultrafine fibrous separator by an electrospinning in accordance with an embodiment of the present invention.
Figure 2:
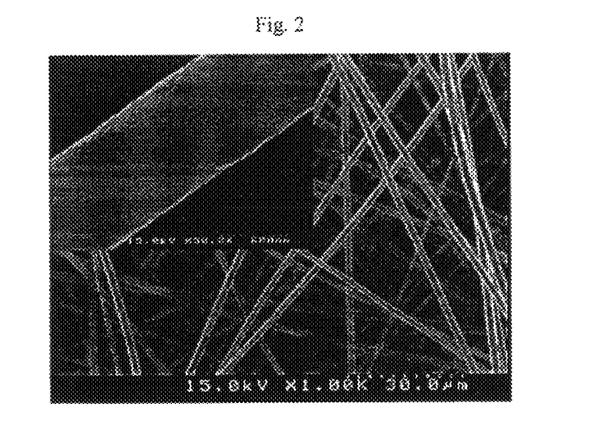
FIG. 2 is a SEM picture of surface of poly(meta-phenylene isophthalamide) ultrafine fibrous separator prepared by the electrospinning in accordance with an embodiment of the present invention.

According to the present invention, the electrospinning is a method for forming an ultrafine fibrous phase. A typical principle of electrospinning is mentioned in many literatures, such as G. Taylor. Proc. Roy. Soc. London A, 313, 453 (1969); J. Doshi and D. H. Reneker, K. Electrostatics, 35 151(1995). As shown in FIG. 1, unlike the electrostatic spray in which liquid having low viscosity is sprayed in ultrafine droplets under an electric field in high-voltage more than a threshold voltage, the electrospinning refers to a process that ultrafine fiber is formed when a polymeric solution or a polymer melt having sufficient viscosity is provided with a high-voltage electrostatic force. An electrospinning apparatus includes a barrel (1) storing a heat-resisting polymer resin solution, a metering pump (2) discharging the heat-resisting polymer solution at a constant speed and a spinning nozzle (4) connected to a high-voltage generator (3). The polymer solution discharged through the metering pump is discharged as ultrafine fibers through the spinning nozzle charged by the high-voltage generator, and porous ultrafine fibers (6) are collected on a grounded collector that is shaped like a conveyor and moves at a constant speed. The polymer solution through the electrospinning process results in the preparation of ultrafine fibers with several nm to several thousands nm, upon the formation of fibers, a porous web that is fused and laminated as a 3-dimensional network structure may also be prepared. This ultrafine fiber web is ultra-thin film, ultra light, extremely high in the ratio of volume to surface area compared to conventional fibers, and high in porosity (refer to FIG. 2).

The formation of the ultrafine fibrous phase in the present invention is possible by a modified process of the conventional meltblown spinning or flash spinning process, and the like, extending the concept of the above electrospinning process, for example, an electro-blowing method. Therefore, the electrospinning process in the present invention may include all those methods.

In the cited references, a polyolefine separator is coated with a heat-resisting polymer resin solution dissolved in an organic solvent. A heat-resisting polymer layer and a porous structure are formed by immersing-coagulating-washing-drying the separator coated using the coagulation solution of water or aqueous solution of the organic solvent. Accordingly, the porous structure of the polyolefine film is blocked by the heat-resisting polymer resin, thereby dropping the ionic conductivity, making it very difficult to control the porosity and the pore size distribution of the heat-resisting polymer layer, and performing very complicated processes such as a solvent extraction, washing-drying, and the like.

However, in the formation of the heat-resisting ultrafine fibrous layer through the electrospinning according to the present invention, a solvent is evaporated during the formation process of the ultrafine fibers and the porous structure is formed by a gap between the accumulated ultrafine fibers and fibers. Thereby a solvent extraction process or a pore formation process is not additionally required as used in the cited references for forming uniform pores.

A lithium secondary battery generates much gas inside the battery at the time of the first electric charging after the battery is sealed. This generation of gas causes bubbles to be generated between the electrode and the polymer electrolyte layer, thereby rapidly deteriorating the battery performance due to poor contact. The coated heat-resisting porous layer in the cited references may cause the deterioration in the battery performance due to the generated gas. However, the heat-resisting ultrafine fibrous layer in accordance with the present invention does not cause problems due to the gas generation.

The heat-resisting polymer resin used in the present invention is heat-resisting resin having a melting point more than 180° C., so that the melt-down of the separator can be prevented even if the temperature continually rises. For example, the heat-resisting polymer resin forming the heat-resisting polymer ultrafine fibrous layer includes aromatic polyester, such as polyamide, polyimide, polyamidimide, poly(metaphenylene isophthalamide), polysulfon, polyether keton, polyether imide, polyethylene terephthalate, polytrimethylene terephthalate, polyethylene naphthalate, etc., a polyphosphazene group, such as polytetrafluoroethylene, poly diphenoxy phosphazene, poly{bis[2-(2-methoxyetoxy) phosphazene]}, polyurethane copolymer including polyurethane and polyetherurethane, resin having a melting point more than 180° C. or not having the melting point, such as cellulose acetate, cellulose acetate butylate, cellulose acetate propionate, etc., and the like. Herein, the resin not having the melting point refers to the resin which is burned without a melted process even at a temperature more than 180° C. Preferably, the heat-resisting polymer resin used in the present invention is dissolved in an organic solvent for an ultrafine fiberization such as the electrospinning.

Preferably, in order to enhance an adhesive force between the polymeric ultrafine fibers and an electrode, an adhesive force between the heat-resisting ultrafine fibers, and the retention capacity of electrolyte, the heat-resisting ultrafine fibrous separator according to the present invention may contain ultrafine fibers of polymer resin having a swelling characteristic in the electrolyte.

This swelling polymer resin is not limited to a certain type as long as it can formed into ultrafine fibers by the electrospinning process. As examples of the resin having the swelling characteristic in the electrolyte are as follows: polyvinylidene fluoride, poly(vinylidene fluoride-co-hexafluoropropylene), perfluoropolymer, polyvinylchloride or polyvinylidene chloride and copolymer thereof, polyethylene glycol derivatives including polyethylene glycol dialkylene ether, polyethylene glycol dialkylene ester, polyoxide including poly(oxymethylene-oligo-oxyethylene), polyethylene oxide and polypropylene oxide, polyvinyl acetate, poly(vinylpyrrolidone-vinyl acetate), polystyrene, and polystyrene acrylonitrile copolymer, polyacrylonitrile copolymer including polyacrylonitrile, polyacrylonitrile methylmethacrylate copolymer, polymethylmethacrylate, polymethylmethacrylate copolymer and mixtures thereof. However, without being limited to the aforementioned examples, any polymer may be used as long as it has an electrochemical stability, an affinity to organic electrolyte solution, and an excellent adhesive force with the electrode. In the present invention, a fluorine resin, such as polyvinylidene fluoride, is more preferable.

Preferably, the heat-resisting ultrafine fibrous separator in accordance with the present invention may contain polyolefine-based fine particles in order to have the shutdown function. The polyolefine-based fine particles used in the present invention are polyolefine-based resin including polyethylene (PE), polypropylene (PP), and copolymer thereof. The fine particles have 100-180° C. of the melting point for the shutdown function, and preferably 120-150° C.

The size of the fine particles should be smaller than the size of pores of the heat-resisting ultrafine fibrous separator, since the fine particles larger than the pores may block the pores, thereby ionic conduction may be prevented. In addition, when the polyolefine particles are too large, it is difficult to perform the electrospinning process with a polymer solution in which the polyolefine particles are dispersed, thereby to form the ultrafine fibers. Therefore, the size of the polyolefine fine particles is 0.05-5 μm, preferably 0.05-3 μm, and more preferably smaller than 1 μm.

Preferably, the content of the polyolefine fine particles is as much as to implement the shutdown function. Properly, it is in the range of 1-50 $g/m^2$ with respect to the heat-resisting ultrafine fibrous separator.

According to the present invention, an average diameter of the fiber forming the heat-resisting ultrafine fibrous separator greatly affects the porosity and the pore size distribution of the separator. That is, the shorter the diameter of the fiber, the smaller the pore size, thereby being smaller the pore size distribution. Further, the shorter the diameter of the fiber, the more increased the specific-surface area of the fiber, thereby increasing the holding capacity of the electrolyte and decreasing the possibility of the electrolyte being leaked. Thus, the diameter of the fiber in the heat-resisting ultrafine fibrous separator is in the range of 1-3000 nm, preferably 1-1000 nm, and more preferably 50-800 nm.

And, the pore size of the heat-resisting ultrafine fibrous separator is in the range of 1-5000 nm, preferably 1-3000 nm, and more preferably 1-1000 nm, so that an excellent holding capacity of the electrolyte can be maintained without leakage.

The porosity of the heat-resisting ultrafine fibrous separator is 30-95%, and preferably 40-90%. If the porosity is below 30%, the ionic conductivity may decrease, and if it is over 80%, mechanical characteristics of the separator may be deteriorated.

The thickness of the heat-resisting ultrafine fibrous separator in accordance with the present invention is 5-200 µm, preferably 5-100 µm, and more preferably 5-30 µm.

According to the present invention, the heat-resisting ultrafine fibrous phase forming the heat-resisting fibrous separator and the ultrafine fibrous phase of polymer resin having the swelling characteristic in the electrolyte are mixed to form the separator, meanwhile, the heat-resisting ultrafine fibrous layer and the ultrafine fibrous layer of the polymer resin having the swelling characteristic in the electrolyte can be laminated alternately to form the separator.

According to the present invention, the content of the ultrafine fibrous phase of the polymer resin which forms the heat-resisting ultrafine fibrous separator and has the swelling characteristic in the electrolyte is 1-95 wt % with respect to polymer components of the separator.

According to the present invention, an inorganic additive may be added into the heat-resisting ultrafine fibrous layer, that is, the heat-resisting polymer resin, or the polymer resin having the swelling characteristic, or both thereof, in order to enhance mechanical characteristics, ionic conductivities and electrochemical characteristics. The inorganic additives which may be used in the present invention are $TiO_2$, $BaTiO_3$, $Li_2O$, LiF, LiOH, $Li_3N$, BaO, $Na_2O$, $Li_2CO_3$, $CaCO_3$, $LiAlO_2$, $SiO_2$, $Al_2O_3$, PTFE and mixtures thereof. The content of the inorganic additives is generally 1-95 wt % with respect to the polymer forming an ultrafine fibrous layer, and preferably 5-50 wt %. In particular, it is preferable to use glass components containing $SiO_2$ in order to suppress an increase of a battery temperature due to a disintegration reaction between the cathode and the electrolyte and a chemical reaction causing a gas generation.

Figure 3:
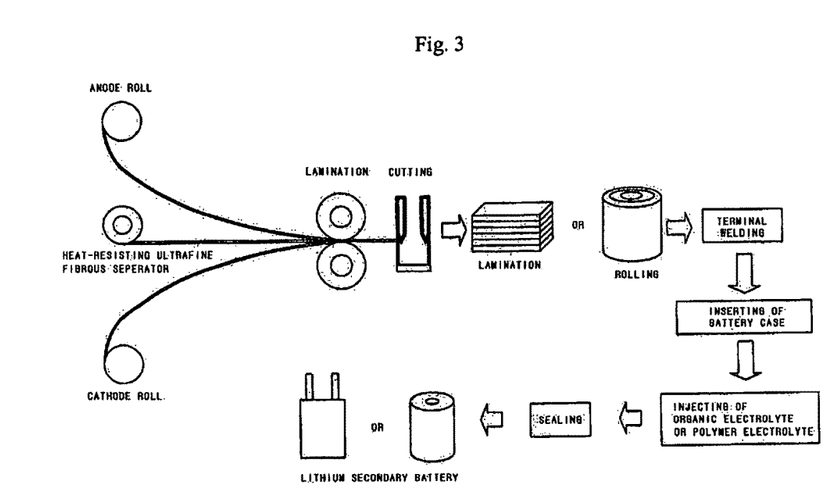
FIG. 3 is a diagram showing a preparation process of a secondary battery using the heat-resisting fibrous separator in accordance with an embodiment of the present invention.
Figure 4:
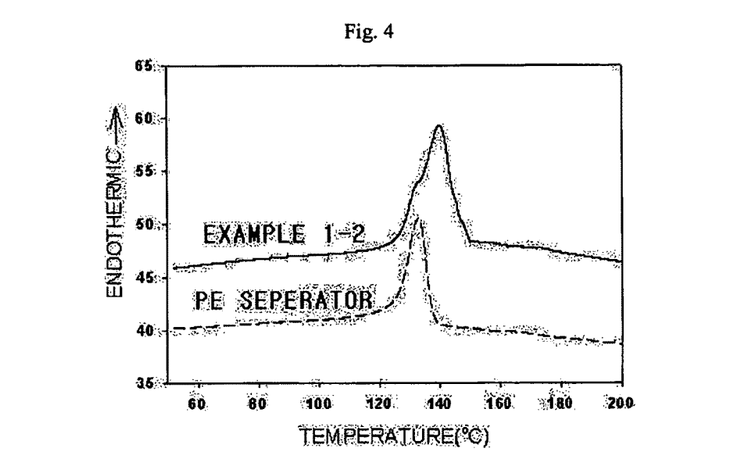
FIG. 4 is a graph showing a thermal behavior of a polyethylene porous film and a heat-resisting polymer ultrafine fibrous separator (Example 1-2).

In order to enhance the adhesive force between the ultrafine fibers and to adjust the porosity and the thickness of the separator, the heat-resisting ultrafine fibrous separator of the present invention, as shown in FIG. 1, is laminated by pressurization below a certain temperature, or as shown in FIG. 3, is laminated by pressurization below a certain temperature after being inserted between the anode and the cathode. Herein, the lamination temperature is room temperature-180° C., preferably room temperature-150° C., and more preferably room temperature-120° C.

The heat-resisting ultrafine fibrous separator of the present invention, in order to enhance the mechanical characteristics, may be maintained between a melting point of a polymer forming the ultrafine fibers and a transition temperature of glass to enhance the crystallization, or may be processed with hot-drawing. The hot-drawing may be performed before the lamination process or performed together with the lamination process.

In a secondary battery in accordance with another aspect of the present invention, a heat-resisting ultrafine fibrous separator in the present invention is inserted between an anode containing a positive active material and a cathode containing a negative active material, laminated, and then injected with an organic electrolyte or a polymer electrolyte. The positive active material may include lithium-cobalt complex oxide, lithium nickel complex oxide, nickel manganese complex oxide, olivin-type phosphate compound. The negative active material is not specifically limited to, as long as it can be used as anhydrous electrolyte battery such as a lithium secondary battery. For example, there are carbon ingredients such as graphite and coke, tartaric oxide, metallic lithium, silicon dioxide, oxide titanium compound and mixtures thereof.

The kinds of lithium salts contained in the organic electrolyte or the polymer electrolyte are not specifically limited to, and can be any lithium salts which is generally used in the lithium secondary battery field. For example, it can be one or a mixture of LiPF6, LiClO4, LiAsF6, LiBF4, LiCF3SO3, LiN(SO2CF3)2, LiN(SO2C2F5)2, LiPF6-x(CnF2n+1)x (1<x<6, N=1 or 2). Among them, $LiPF_6$ is more preferable. The concentration of lithium salts is 0.5~3.0M, but an organic electrolyte of 1M is generally used.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention.

Example 1-1

In order to prepare a heat-resisting polymer ultrafine fiber by an electrospinning, 10 g of poly(meta-phenylene isophthal amide) and 5 g of poly (vinylidene fluoride-co-hexafluoropropylene) copolymer (Kynar 2801) are added into 85 g of dimethylacetamide (DMAc), and then stirred at a room temperature, thereby a heat-resistant polymer resin solution is obtained. Also, the heat-resisting polymer resin solution is inputted to a barrel of an electrospinning apparatus as shown in FIG. 1, and then discharged using a metering pump at a speed of 150 µl/min. Herein, electric charge of 17 kV is applied to a spinning nozzle (4) using a high-voltage generator, so that ultrafine fiber web with the thickness of 40 µm is prepared from a mixture of the poly(meta-phenylene isophthal amide) and the poly(vinylidene fluoride-co-hexafluoropropylene). That is, the fiber forming the separator includes a phase of a heat-resisting polymeric material and a phase of a swelling polymeric material.

An ultrafine fiber web which is the mixture of the poly (meta-phenylene isophthal amide) and the poly(vinylidene fluoride-co-hexafluoropropylene) laminated by pressurization at a temperature of 100° C., so that a heat-resisting ultrafine fibrous separator having the thickness of 20 µm is prepared. An apparent porosity, the electrolyte uptake (%), Shrinkage rates at the temperature of 120° C. and 150° C. of this separator are shown in Table 1.

Example 1-2

In order to prepare a heat-resisting polymer ultrafine fiber by an electrospinning, 15 g of poly(meta-phenylene isophthal amide) is added into 85 g of dimethylacetamide (DMAc), and then stirred at a room temperature, thereby a heat-resistant polymer resin solution is obtained. Also, 5 g of poly (vinylidene fluoride) [Kynar 761] is dissolved in 95 g of dimethylacetamide (DMAc), into which 10 g of polyethylene fine powders (0.1 μm) having 132° C. of softening point are dispersed to prepare a dispersed solution. Two polymer solutions are electrospun through separated spinning nozzles, respectively, in a same discharging speed, accordingly, a web which is a mixture of poly(meta-phenylene isophthal amide) ultrafine fibrous phase and poly(vinylidene fluoride)/polyethylene ultrafine fibrous phase and has the thickness of 40 μm is prepared. That is, the separator includes two kinds of fibers, one is a fiber including the fibrous phase of heat-resisting polymer material, the other is the fiber including the fibrous phase of swelling polymeric material and polyolefine-based fine particles.

The prepared web is laminated by compression at a temperature of 120° C., so that a heat-resisting ultrafine fibrous separator having the thickness of 20 μm is prepared. An apparent porosity, the electrolyte uptake (%), Shrinkage rates at the temperature of 120° C. and 150° C. of this separator are shown in Table 1.

Example 1-3

A web which is a mixture of poly(meta-phenylene isophthal amide) ultrafine fibrous phase and poly(vinylidene fluoride)/polyethylene ultrafine fibrous phase and has the thickness of 60 μm an is prepared in the same method with the example 1-2, and then is laminated by compression at a temperature of 125° C., so that a heat-resisting ultrafine fibrous separator having the thickness of 20 μm is prepared. An apparent porosity, the electrolyte uptake (%), Shrinkage rates at the temperature of 120° C. and 150° C. of this separator are shown in Table 1.

Example 1-4

A web which is a mixture of poly(meta-phenylene isophthal amide) ultrafine fibrous phase and poly(vinylidene fluoride)/polyethylene ultrafine fibrous phase and has the thickness of 45 μm is prepared in the same method with the example 1-2, except that polypropylene fine powders (0.2 μm) having a softening point of 148° C. is used, instead of polyethylene fine powders (0.1 μm) having a softening point of 132° C., and then is laminated by compression at a temperature of 140° C., so that a heat-resisting ultrafine fibrous separator having the thickness of 20 μm is prepared. An apparent porosity, the electrolyte uptake (%), Shrinkage rates at the temperature of 120° C. and 150° C. of this separator are shown in Table 1.

Example 1-5

As the heat-resisting separator prepared in Example 1 is shown in FIG. 3, the heat-resisting separator is inserted between the anode and the cathode, is experienced a lamination process for a hot-press by using a preheated roller at approximately 80° C., is immersed in a 1M $LiPF_6$ EC/DMC/DEC (1/1/1) solution, and then is injected by an electrolyte, and is vacuum-sealed with an aluminum plastic pouch, thus to prepare a lithium secondary battery. Then, the prepared lithium secondary battery is stored and aged at approximately 50° C. before use. The capacity of the batteries maintained after a 200-cycling charging/discharging is performed at a room temperature is shown in Table 1.

Comparison Example 1

7.5 g of poly(meta-phenylene isophthalamide) and 7.5 g of poly (vinylidene fluoride-co-hexafluoropropylene) copolymer (Kynar 2801) are added into 85 g of dimethylacetamide (DMAc), and then is stirred at a room temperature, thereby a transparent heat-resisting polymer resin solution is obtained. A polyethylene porous film (Celgard® 2730) having a thickness of 21 μm and a porosity of 43% is impregnated into the heat-resisting polymer resin solution, thereby coating films having two surfaces, each surface having the thickness of 5 μm are prepared. And then, the coating films are immersed into a coagulation solution mixed with dimethylacetamide and water (1:1), washed, and then dried. An apparent porosity, the electrolyte uptake (%), Shrinkage rates at the temperature of 120° C. and 150° C., and the capacity of the battery maintained after a 200-cycling charging/discharging is performed at a room temperature of this separator are shown in Table 1.

TABLE 1

| | Thermal Shrinkage | | Electrolyte solution uptake | Apparent porosity | Charging/ discharging effiency (%, |
|---|---|---|---|---|---|
| | 120° C. | 150° C. | (%) | (%) | 200 cycle) |
| PE separator | 10 | 38 | 119 | 45 | |
| Comparison 1 | 0.15 | 2.3 | 125 | — | 83 |
| Example 1-1 | 0.1 | 3.8 | 300 | 82 | 90 |
| Example 1-2 | 0.2 | 2.3 | 340 | 83 | 97 |
| Example 1-3 | 0.1 | 0.15 | 395 | 65.7 | 96 |
| Example 1-4 | 0.12 | 0.18 | 320 | 76 | 96 |

Example 2-1

In order to prepare a heat-resisting polymer ultrafine fibrous separator by an electrospinning, a polyimide/poly (vinylidene fluoride-co-hexafluoropropylene) ultrafine fiber web having the thickness of 50 μm is prepared in the same method with Example 1-1, except for using a solution in which 10 g of a polyimide [Matrimid 5218, Ciba Specialty Co.] and 10 g of poly(vinylidene fluoride-co-hexafluoropropylene) copolymer (Kynar 2801) are added into 80 g of a solution mixed with dimethylacetamide (DMAc) and tetrahydrofuran (7:3). And the web is laminated by compression at a temperature of 120° C., so that a heat-resisting ultrafine fibrous separator having the thickness of 20 μm is prepared. An apparent porosity, the electrolyte uptake (%), Shrinkage rates at the temperature of 120° C. and 150° C., and the capacity of the battery maintained after a 200-cycling charging/discharging is performed at a room temperature of this separator are shown in Table 2.

Example 2-2

A web which is a mixture of polyimide ultrafine fibrous phase and poly (vinylidene fluoride-co-hexafluoropropylene)/polyethylene ultrafine fibrous phase and has the thickness of 60 μm is prepared in the same method with the example 1-2, except that polyimide [Matrimid 5218, Ciba Specialty Co.] is used instead of poly(meta-phenylene isophthal amide). And the prepared web is laminated by compression at a temperature of 120° C., so that a heat-resisting ultrafine fibrous separator having the thickness of 20 μm is prepared. An apparent porosity, the electrolyte uptake (%), Shrinkage rates at the temperature of 120° C. and 150° C., and the capacity of the battery maintained after a 200-cycling charging/discharging is performed at a room temperature of this separator are shown in Table 2.

Example 2-3

A heat-resisting polymer ultrafine fibrous separator, which is a mixture of a polytrimethylene terephthalate ultrafine fiber and a poly(vinylidene fluoride-co-hexafluoropropylene)/ polyethylene ultrafine fibrous phase and has the thickness of 40 μm is prepared in the same method with the example 1-2, except for using a solution in which 10 g of a polytrimethylene terephthalate (intrinsic viscosity of 0.92, Shell Co.) is dissolved into 90 g of a solution mixed with trifluoroacetic acid and methylene chloride (1:1). And the prepared web is laminated at a temperature of 120° C., so that a heat-resisting ultrafine fibrous separator having the thickness of 20 μm is prepared. An apparent porosity, the electrolyte uptake (%), Shrinkage rates at the temperature of 120° C. and 150° C., and the capacity of the battery maintained after a 200-cycling charging/discharging is performed at a room temperature of this separator are shown in Table 2.

Example 2-4

In order to prepare a heat-resisting polymer ultrafine fiber by an electrospinning, a web which is a mixture of a polyurethane ultrafine fiber and a poly(vinylidene fluoride-co-hexafluoropropylene)/polyethylene ultrafine fibrous phase and has the thickness of 40 μm is prepared in the same method with the example 1-2, except for using a solution in which 15 g of polyurethane [Pelletan2 2363-80AE, Dow Chemical Co.] is dissolved into 85 g of a solution mixed with a dimethylacetamide (DMAc) and acetone (7:3). And the prepared web is laminated by compression at a temperature of 120° C., so that a heat-resisting ultrafine fibrous separator having the thickness of 20 μm is prepared. An apparent porosity, the electrolyte uptake (%), Shrinkage rates at the temperature of 120° C. and 150° C., and the capacity of the battery maintained after a 200-cycling charging/discharging is performed at a room temperature of this separator are shown in Table 2.

TABLE 2

|  | Thermal Shrinkage | | Electrolyte solution uptake (%) | Apparent porosity (%) | Charging/ discharging effiency (%, 200 cycle) |
| --- | --- | --- | --- | --- | --- |
|  | 120° C. | 150° C. |  |  |  |
| Example 2-1 | 0.1 | 0.15 | 285 | 68 | 95.4 |
| Example 2-2 | 0.11 | 0.16 | 270 | 73.4 | 93.8 |
| Example 2-3 | 0.15 | 2.1 | 290 | 80 | 91 |
| Example 2-4 | 0.20 | 3.5 | 320 | 81 | 97 |

Porosity Measurement

An apparent porosity (%) of the heat-resisting ultrafine fibrous separator was determined according to the following formula.

$$P(\%)=\{1-(\rho_m/\rho_P)\}\times 100\%$$

(P: apparent porosity, $\rho_M$: density of heat-resisting fibrous separator, $\rho_P$: density of heat-resisting polymer)

Measurement of an Electrolyte Uptake

The heat-resisting ultrafine fibrous separator of 3 cm by 3 cm prepared in Example 1-1, is immersed into 1M $LiPF_6$ EC/DMC/DEC (1/1/1) electrolyte solution for about 2 hours at a room temperature, and then any excessive electrolyte remaining on the surface thereof is removed by a filter paper, thereby weighing to determine an absorption rate of the electrolyte.

Measurement of Thermal Shrinkage

The heat-resisting ultrafine fibrous separator of 5 cm by 2 cm prepared in Example 1-1, is inserted between two slide glasses, and then is tightened by a clip, thereafter is left alone for 10 minutes at a temperature of 120° C. and 150° C., respectively, so as to calculate a shrinkage rate.

Thermal Behavior of Separator

Researches on the thermal behavior of the heat-resisting fibrous separator, that is, a shutdown function and a short circuit temperature, etc. are measured in a speed of 10° C./min under an atmosphere filled with nitrogen gas, using DSC-7 (Perkin-Elmer Co.).

Electrode Preparation

In the aforementioned embodiments and comparison examples, for the anode, slurry including PVdF binder, super-P carbon, and $LiCoO_2$ (product of Japan Chemical Co.) is cast into an aluminum foil. For the cathode, slurry including MCMB (product of Osaka Gas Co. Ltd.), PVdF, super-P carbon is cast into a copper foil. A theoritical capacity of the electrode is 145 mAh/g. However, the anode and the cathode included in the lithium secondary battery of the present invention are not limited to have the above-mentioned construction. The lithium secondary battery according to the present invention may be constructed by using the anode and the cathode which are widely known to those skilled in the art. Further, in order to enhance an adhesive force between particles and metallic foils, the slurries of the anode and the cathode are cast so that the thickness of the electrode can be approximately 50 μm through a roll pressing.

Charging/Discharging Performance

The battery is charged in a condition for charging of a constant current and a constant voltage, which is 0.68 mA/cm$^2$ (0.2 C) of a current density and 4.2V, and discharged to 2.75V in 3.4 mA/cm$^2$ (1 C). The charging/discharging cycling test performed by assessing maintained capacity (%) after 200-cycling at a room temperature.

The invention claimed is:

1. A heat-resistant, ultrafine fibrous separator configured for use as a separator in an electrochemical battery or a capacitor, comprising:
    a first fibrous phase comprising fibers that comprise a first polymeric material having a melting point of more than 180° C. or not having a melting point; and
    a second fibrous phase comprising a second polymeric material that is free of electrolyte, said second polymeric material swelling in electrolyte.

2. The heat-resistant, ultrafine fibrous separator of claim 1, wherein the first polymeric material comprises at least one of aromatic polyester, polyamide, polyimide, polyamidimide, poly(meta-phenylene isophthalamide), polysulfone, polyether ketone, polyether imide, polyphosphazene group, polytetrafluoroethylene, polyurethane copolymer, cellulose acetate, cellulose acetate butylate, cellulose acetate propionate, and combinations thereof.

3. The heat-resistant, ultrafine fibrous separator of claim 1, wherein the content of the fibrous phase of the second polymeric material is 1-95 wt % with respect to the polymer components of the separator.

4. The heat-resistant, fibrous separator of claim 1, wherein the second polymeric material comprises at least one of polyvinylidene fluoride, poly(vinylidene fluoride-co-hexafluoropropylene), perfluoropolymer, polyvinylchloride or polyvinylidene chloride and copolymer thereof, polyethylene glycol derivatives, poly-oxide, polyvinyl acetate, poly(vinylpyrrolidone-vinyl acetate), polystyrene, polystyrene acrylonitrile copolymer, polyacrylonitrile copolymer, polymethylmethacrylate, polymethylmethacrylate copolymer, and combinations thereof.

5. The heat-resistant, ultrafine fibrous separator of claim 1, wherein the separator further comprises polyolefine-based fine particles.

6. The heat-resistant, ultrafine fibrous separator of claim 5, wherein a melting point of the fine particles is in the range of 100-180° C.

7. The heat-resistant, ultrafine fibrous separator of claim 5, wherein the size of the fine particles is in the range of 05-5 μm.

8. The heat-resistant, ultrafine fibrous separator of claim 5, wherein the content of the fine particles is in the range of 1-50 g/m$^2$ with respect to the separator.

9. The heat-resistant, ultrafine fibrous separator of claim 1, wherein an average diameter of the fibers forming the fibrous phases forming the separator is in the range of 1-3000 nm.

10. The heat-resistant, ultrafine fibrous separator of claim 1, wherein the porosity of the separator is in the range of 30-80%.

11. The heat-resistant, ultrafine fibrous separator of claim 1, wherein the thickness of the separator is in the range of 5-200 μm.

12. The heat-resistant, ultrafine fibrous separator of claim 1, wherein the separator further comprises inorganic additives selected from $TiO_2$, $BaTiO_3$, $Li_2O$, LiF, LiOH, $Li_3N$, BaO, $N_2O$, $Li_2CO_3$, $CaCO_3$, $LiAlO_2$, $SiO_2$, $Al_2O_3$, and combinations thereof.

13. A secondary battery, comprising:
two different electrodes;
a separator inserted between the two electrodes; said separator being a heat-resistant, ultrafine fibrous separator of claim 1; and
an electrolyte.

14. The secondary battery of claim 13, wherein the separator is coupled to at least one electrode of the two electrodes.

15. A method for fabricating a heat-resistant, ultrafine fibrous separator, comprising:
electrospinning a mixing solution containing a first heat-resistant, polymeric material having a melting point of more than 180° C. or not having a melting point to form a first fibrous phase and electrospinning a second polymeric material that is swellable when contacted with electrolyte to form a second fibrous phase, said first and second fibrous phases forming a ultrafine fiber web; wherein said second polymeric material is electrospun in the absence of electrolyte; and
thermally laminating the ultrafine fiber web by pressurization.

16. A method for fabricating a heat-resistant, ultrafine fibrous separator, comprising:
electrospinning separately a solution containing a heat-resistant polymeric material having a melting point of more than 180° C. or not having a melting point and a solution containing polymeric material that is swellable when contacted with electrolyte to form a ultrafine fiber web composed of a heat-resisting polymeric ultrafine fiber including a heat-resistant polymeric ultrafine fibrous phase and an ultrafine fiber fibrous phase comprising polymeric material that is swellable when contacted with electrolyte; wherein said swellable polymeric material is electrospun in the absence of electrolyte; and
thermally laminating the ultrafine fiber web by pressurization.

17. The method of claim 15, wherein hot-drawing of the ultrafine fiber web is processed before or after the thermally laminating by pressurization thereof.

18. The method of claim 16, wherein hot-drawing of the ultrafine fiber web is processed before or after the thermally laminating by pressurization thereof.

19. The heat-resistant, ultrafine fibrous separator of claim 2, wherein the aromatic polyester comprises at least one of polyethylene terephthalate, polytrimethylene terephthalate, polyethylene naphthalate, and combinations thereof.

20. The heat-resistant, ultrafine fibrous separator of claim 2, wherein the polyphosphazene group comprises at least one of poly diphenoxy phosphazene, poly{bis[2-(2-methoxyethoxy)phosphazene]}, and combinations thereof.

21. The heat-resistant, ultrafine fibrous separator of claim 2, wherein the polyurethane copolymer comprises at least one of polyurethane and polyetherurethane.

22. The heat-resistant, ultrafine fibrous separator of claim 4, wherein the polyethylene glycol derivatives comprises at least one of polyethylene glycol dialkylene ether and polyethylene glycol dialkylene ester.

23. The heat-resistant, ultrafine fibrous separator of claim 4, wherein the polyoxide comprises at least one of poly (oxymethylene-oligo-oxyethylene), poly(ethylene oxide), and polypropylene oxide.

24. The heat-resistant, ultrafine fibrous separator of claim 4, wherein the polyacrylonitrile copolymer comprises at least one of polyacrylonitrile and polyacrylonitrile methylmethacrylate copolymer.

25. The heat-resistant, ultrafine fibrous separator of claim 1, wherein said first and second fibrous phases are formed by electrospinning fibers from a solution of polymeric material that is free of electrolyte.

26. The heat resistant ultrafine fibrous separator of claim 5 in which the particles are present in the second fibrous phase.

27. A heat-resistant, ultrafine fibrous separator made by the method of claim 15.

28. A heat-resistant, ultrafine fibrous separator made by the method of claim 16.

* * * * *